May 5, 1959 G. A. LYON 2,885,245
WHEEL COVER
Filed March 27, 1953
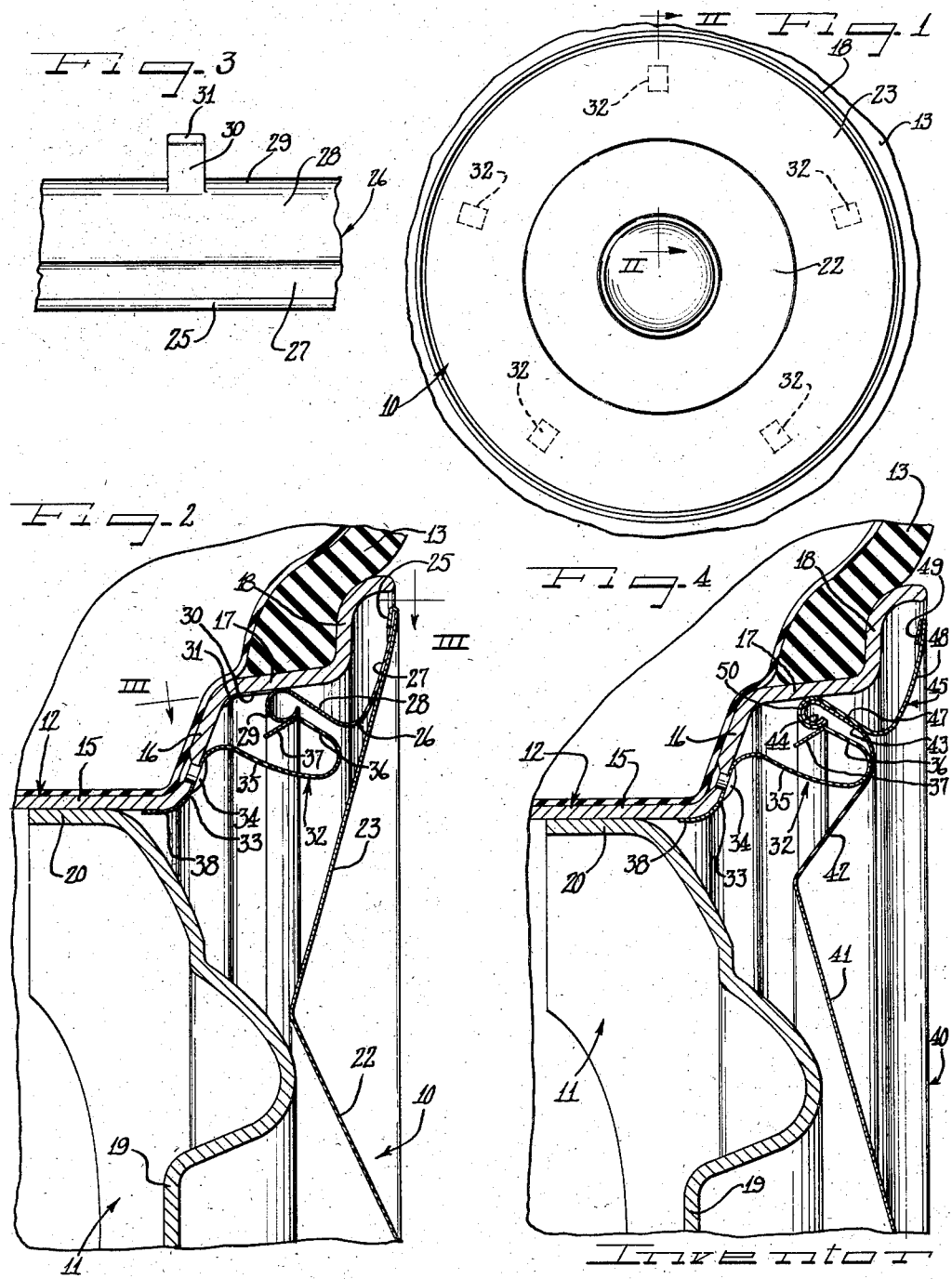
Inventor
George Albert Lyon 2,885,245
Patented May 5, 1959

2,885,245
WHEEL COVER
George Albert Lyon, Detroit, Mich.

Application March 27, 1953, Serial No. 345,194

13 Claims. (Cl. 301—37)

The present invention relates to improvements in wheel structures and more particularly concerns the ornamental and protective covering of the outer sides of vehicle wheels.

An important object of the present invention is to provide a wheel structure including a novel wheel cover arrangement.

Another object of the present invention is to provide improved means for detachably retaining a wheel cover on a wheel in centered, rattle-free relation thereto.

A further object of the invention is to provide novel means for retaining a cover in limited engagement with one portion and in predetermined spaced relation to another portion of a wheel.

Yet another object of the invention is to provide an improved cover for disposition at the outer side of a wheel.

Other objects, features and advantages of the present invention will be readily apparent from the following detailed description of certain preferred embodiments thereof taken in conjunction with the accompanying drawings, in which:

Figure 1 is a front elevational view of a wheel structure embodying the features of the present invention;

Figure 2 is an enlarged fragmentary radial section taken substantially on the line II—II of Figure 1;

Figure 3 is a detail view of the rear of a portion of the cover showing one of the centering and bottoming fingers; and Figure 4 is an enlarged fragmentary radial section showing a modified form of the present invention.

A cover 10 embodying features of the invention is adapted to be applied to the outer side of a vehicle wheel including a wheel body 11 peripherally supporting a tire rim 12 of the multi-flange drop center type adapted for supporting a pneumatic tire and tube assembly 13.

The tire rim 12 comprises a base flange 15 having an outer side flange 16 extending generally radially outwardly and slightly axially outwardly. Directed generally axially outwardly and sloping radially outwardly from the side flange 16 is an intermediate flange 17 which merges in a terminal flange 18.

The wheel body 11 is preferably of the disk spider type and comprises a stamping made from suitable heavy gauge sheet metal and having a central bolt-on flange 19 and an outer peripheral attachment flange 20 secured to the base flange 15 of the tire rim.

According to the present invention, means are provided on the tire rim 12 and on the wheel cover 10 for detachably retaining the cover member in spaced relation to the wheel body. To this end the cover 10 comprises a metallic plate preferably stamped to form from suitable thin gauge sheet material, such as stainless steel, brass, or the like. Herein the cover comprises a central crown portion 22 extending radially outwardly and axially inwardly, and, in assembly with the wheel lying in spaced relation to the body 11. The crown portion 22 merges divergently angularly with an annular outer portion 23 extending obliquely radially and axially outwardly to lie in spaced relation to the tire rim 12. For reinforcement, the outer marginal portion of the annular portion 23 is turned under to form a reenforcing and finishing flange or bead 25.

Concealed behind the cover 10 in the space between the annular outer portion 23 and the tire rim 12 are means for holding the cover against radial displacement relative to the wheel. In the form shown in Fig. 2, such means comprise an annular member 26 of generally L-shape cross section which may be rolled from any suitable thin gauge sheet metal strip that may be of a cheaper grade material than the cover plate.

An outer flange 27 on the member 26 extends generally radially and axially outwardly and nests against the inner side of the outer cover portion 23 with the outer margin of the flange crimped in place by the underturned flange 25. An inner flange 28 of the member 26 is directed generally axially inwardly and slightly radially outwardly from juncture with the outer flange 27, and by reason of its angular relation to flange 27, serves to rigidify the annular member 26 as a whole.

For positioning the cover 10 against radial displacement with respect to the wheel, the inner marginal portion of the flange 28 provides means for engaging the intermediate flange 17. To this end, the inner marginal portion of the flange 28 includes an annular series of generally axially inwardly extending resilient terminal fingers or extensions 30 and inturned bead sections 29 arranged in an alternating pattern in suitable plurality at the axially inner end portion of the flange 28. Normally, the fingers 30 extend toward their terminals to a diameter slightly greater than the diameter of, or at least as large as the medial inner surface diameter of the intermediate flange. As a result the fingers are radially inwardly cammed and radially inwardly deflected and tensioned by the rim intermediate flange 17 as the cover 10 is pressed home. This resiliently takes up any radial manufacturing tolerance looseness between the flange 28 of the annular member 26 in assembly with the intermediate flange 17.

By preference, the fingers 30 are provided with generally radially and axially inwardly turned terminals 31 which may conform generally to the curvature of the juncture between rim side flange 16 and rim intermediate flange 17, and thrust against the tire rim side flange 16 to limit axially inward disposition of the cover on the wheel.

To retain the cover against axial displacement from the wheel, there is mounted on the tire rim a plurality of gooseneck retaining clips 32. Respective base flanges 33 on the clips are secured to the side flange 16 of the tire rim as by means of rivets 34.

Each of the retaining clips 32 comprises a generally axially outwardly extending resilient arm 35 having a reversely bent generally axially inwardly and radially outwardly directed resilient head or loop portion which provides a camming flange 36. The radially outer end of the camming flange 36 terminates in a relatively short radially and axially inwardly directed terminal flange or retaining shoulder 37. A tail portion 38 on the base flange 33 of the spring clip is provided generally conformable to the transversely curved juncture between the rim flanges 15 and 16 to retain the spring clip 32 against turning about the axis of the attaching rivet 34.

In applying the cover 10 to the wheel, it is initially centered with respect to the wheel so that the spaced fingers 30 on the annular member 26 are in guiding, centering relation to the axially outer margin of the inner surface of the intermediate rim flange 17. The cover member 10 is then firmly pressed in an axially inward direction to cam the bead sections 29 against the camming flanges 36 of the retaining clips 32 to flex the clips in a radially inward direction until the bead sections snap behind the retaining flanges 37. At the same time the terminals 31 of the spaced fingers 30 are resiliently inwardly deflected and tensioned by the intermediate flange 17 and finally engage at their tips in limiting thrust against the rim side flange 16. Thereby, the cover 10 is held in predetermined axially spaced disposition to the wheel body, and in substantially centered, rattle-free relation to the wheel.

By having the bead and retaining shoulder flanges 36 and 37 of the clips 32 of substantially greater width than the spaces left between the bead sections 29 by the take-up and limit stop fingers 30, effective precaution against the projection of the clips into the spaces is assured, if by chance the spring clips should come into registry with any of the spaces in the application of the cover to the wheel. In this instance, the width of the spring clip flanges is preferably about twice the width of the respective spaces between adjacent bead sections.

In the modification of Fig. 4, a cover 40 is applied to a wheel which may be substantially identical to the wheel shown in Fig. 2, like parts being similarly numbered.

The cover 40 comprises a radially outwardly and axially inwardly directed crown portion 41 which in assembly with the wheel lies in axially outwardly spaced relation to the wheel body 11 and merges angularly with an annular radially and axially outwardly directed marginal portion 42 arranged to be in spaced relation opposite the tire rim. Extending angularly radially outwardly and axially inwardly from the marginal portion 42 and directed toward the rim intermediate flange 17, is a flange 43 which terminates in an inturned reinforcing bead 44. The juncture of flanges 42 and 43 provides an annular axially inwardly opening channel or pocket which in assembly with the wheel is shaped to seat against the loop portion of the spring arm 34, thereby positioning the cover 40 in predetermined axially spaced relation to the wheel.

In this instance, an annulus 45, which is in many respects similar to annular member 26 but is exposed as a marginal extension of the cover assembly, is utilized to substantially overlie the rim terminal flange 18. The annulus 45 may be rolled from any suitable thin gauge sheet metal strip, such as stainless steel, brass or the like, and is of generally L-shape cross section comprising an inner flange 47 and an outer flange 48. The inner flange 47 extends generally radially inwardly and axially outwardly, preferably complemental to and disposed in nested relation to the cover flange 43. The outer flange 48 extends generally radially and axially outwardly so as to lie in assembly in spaced relation to the rim terminal flange 18. The outer marginal portion of the outer flange 48 is reinforced by an underturned reinforcing flange 49 which is spaced from the terminal flange 18 of the rim for accommodating wheel balancing weights.

For holding the annulus 45 in assembly with the cover flange 43, the inner annulus flange 47 is provided with an inturned annular attachment bead 50 which is interlockingly internested about the cover bead 44.

To maintain the cover centered on the wheel and to guard against radial displacement movement of the cover, the axially inner portion of the flange 47 at least closely approaches and may engage the inner surface of the rim intermediate flange 17.

Retention of the cover 40 on the wheel is effected by the spring clips 32 in the same manner as shown in Fig. 2, the retaining flange 37 being adapted to resiliently engage and urge the bead 46 of the annulus 45 in an axially inward direction. Axially inward movement of the bead 50 is limited in this instance by the engagement of the loop bead portion of the clips with the inner side of the cover portion 42 adjacent juncture with cover flange 43. In this manner the spring clips 32 retain and support the cover in axially spaced relation to the wheel body.

In applying the cover 40 to the wheel, it is generally centered with respect to the wheel and with the bead 50 engaging the clip bead cam flanges 36, and then pressed home. Axially inward movement of the bead 46 causes the engaged flanges 36 of the spring clips 32 to be cammed radially inwardly until the bead 46 snaps behind the retaining shoulder flanges 37. The cover then comes to rest against the clips of the spring clips.

In either of Figs. 2 or 4, the spring clips 32 are arranged in a balanced pattern about the tire rim, five being used as illustrated in Fig. 1, although a larger or smaller number might be used depending on cover size and service requirements.

Removal of the cover is readily accomplished by inserting a pry-off tool, such as a screw driver (not shown), behind the underturned flange 35 of Fig. 2 or 49 of Fig. 4 and applying leverage to exert an outward force on the outer margin of the cover, using the edge of the rim terminal flange 18 as a fulcrum.

In both forms of the cover the outer marginal flange of the marginal annulus provides a convenient wheel balancing weight chamber in cooperation with the tire rim terminal flange. Moreover, the inner marginal flange of the annulus cooperates so closely with the intermediate flange of the tire rim that passage of foreign matter is blocked from said space between the annulus and the tire rim to the chamber behind the cover enclosing the wheel body.

It will be understood that modifications and variations may be effected without departing from the scope of the novel concepts of the present invention.

I claim as my invention:

1. In a wheel structure including tire rim and wheel body parts, with cover retaining spring clips, a cover for the outer side of the wheel, said cover comprising a body portion and an annulus carried by said body portion, said annulus having a marginal flange having a portion retainingly engageable with said spring clips, and stop means alternating with said marginal flange portion projecting from said annulus for engaging one of said wheel parts for limiting axially inward disposition of the cover on the wheel.

2. In a wheel structure including tire rim and wheel body parts, with cover retaining spring means, a cover member for the outer side of the wheel, an annulus carried by said cover member, an inner marginal portion on said annulus for closely cooperating with the tire rim part to hold said cover member against radial displacement relative to the wheel, extensions on said inner marginal portion engageable with the tire rim part for limiting axially inward movement of the cover member in its application to the wheel, said inner marginal portion having a bead engageable with said spring means for retaining the cover in snap-on, pry-off relation on the wheel.

3. In a wheel structure including a tire rim having outer intermediate and side flanges and a wheel body supporting the tire rim with spring means carried by said side flange, a cover member for the outer side of the wheel, an annular member attached to the outer periphery of said cover member and disposed behind said cover member, an inner marginal portion on said annular member arranged to oppose said intermediate flange for centering and holding said cover member against radial displacement relative to the wheel, a plurality of extension fingers integral with said marginal portion and resiliently engageable with said intermediate flange for taking up slack between the intermediate flange and the marginal portion, said inner marginal portion being retainingly engageable with the spring means for retaining the cover against axial outward displacement from the wheel.

4. In a wheel structure including tire rim and wheel body parts with cover retaining spring means, a cover member for the outer side of the wheel, an annulus carried by the cover member, and an inner marginal portion on said annulus cooperative with said spring means for resiliently urging said annulus and cover member in an axially inward direction toward the wheel and also cooperative with the rim part to hold the cover against radial displacement, said cover member having a part thereof in cooperative engagement with said spring clips for holding the cover member in predetermined axially spaced relation to the wheel body part.

5. In a wheel structure having a wheel including a body part, a flanged tire rim having generally radial and inclined axial flanges and circumferentially spaced cover retaining springs clips carried by the wheel, a wheel cover comprising a circular member having a rearwardly extending flange terminating in a turned edge for resilient snap-on engagement with said clips, said flange being inclined radially outwardly and axially inwardly and having its turned edge disposed for resilient wedging against said axial rim flange by the resilient force of said clips when stressed by the engagement thereof by said cover turned edge, said turned edge also having projecting axially therefrom extensions extending along said axial flange for engagement with said radial flange for bottoming the cover thereon.

6. In a wheel structure having a wheel including a body part, a flanged tire rim having generally radial and inclined axial flanges and circumferentially spaced cover retaining spring clips carried by the wheel, a wheel cover comprising a circular member having a rearwardly extending flange terminating in a turned edge for resilient snap-on engagement with said clips, said flange being inclined radially outwardly and axially inwardly and having its turned edge disposed for resilient wedging against said axial rim flange by the resilient force of said clips when stressed by the engagement thereof by said cover turned edge, said turned edge also having projecting axially therefrom extensions extending along said axial flange for engagement with said radial flange for bottoming the cover thereon, each of said extensions having a radially inwardly turned extremity contoured to nest generally in the junction of said rim flanges.

7. In a wheel structure having a wheel including a body part, a flanged tire rim having a generally radial and axially inclined flange and circumferentially spaced cover retaining spring clips carried by the wheel, a wheel cover comprising a circular member having a rearwardly extending flange terminating in a turned edge for resilient snap-on engagement with said clips, said flange being inclined radially outwardly and axially inwardly and having its turned edge disposed for cover centering engagement against said axial rim flange by the resilient force of said clips when stressed by the engagement thereof by said cover turned edge, said cover flange having a double thickness of metal, one of which is extended radially outwardly to define the peripheral outer margin of the cover and the other of which is extended radially inwardly to define the center of the cover.

8. In a wheel structure including a tire rim having an intermediate generally axially extending and radially inwardly facing annular flange, with cover retaining means spaced radially inwardly from said intermediate flange, a cover for disposition at the outer side of the wheel including an annulus of a diameter to overlie the tire rim, and a cover plate carried by the annulus and having a radially outer margin thereof interlocked with the annulus, said annulus having a generally axially extending annular portion for generally telescoped disposition relative to said rim flange, with cover retaining flange structure on the axially inner part of said axially extending annular portion extending generally radially inwardly and retainingly engageable with said cover retaining means for retaining the cover in axial disposition on the wheel, said annular portion having thereon structure disposed radially outwardly from said retaining flange structure and projecting generally radially outwardly for engagement with said radially inwardly facing rim flange for centering the cover on the wheel and to guard against radial displacement movement of the cover.

9. A wheel structure according to claim 8, wherein said radially outwardly projecting cover centering structure includes generally radially resiliently deflectable tab-like finger elements that normally extend to a diameter greater than the diameter of an engageable portion of the rim flange so that such fingers are radially inwardly cammed and radially inwardly deflected and tensioned by the rim flange as the cover is pressed home relative to said cover retaining means on the wheel.

10. In a wheel assembly including a wheel having a plurality of spaced wheel cover retaining means and a drop center rim having an intermediate base flange with said retaining means spaced radially inwardly from said flange, a wheel cover comprising a circular ornamental disk disposed over said wheel and the intermediate base flange of said rim, and an annulus in nested relation with said disk and having its radially outer periphery interlocked with said disk by a turned-over edge, the radially inner periphery of said annulus extending axially inwardly and into engagement with said retaining means on said wheel, and an intermediate shoulder on said annulus nested within the intermediate base flange of said rim, said shoulder having resilient fingers directed generally radially outwardly for engagement with said intermediate base flange.

11. In a wheel assembly including a wheel having a plurality of spaced wheel cover retaining means and a drop center rim having an intermediate base flange with said retaining means spaced radially inwardly from said flange, a circular ornamental disk disposed over said wheel and the intermediate base flange of said rim, and an annulus in nested relation with said disk and having its radially outer periphery interlocked with said disk, the radially inner periphery of said annulus extending toward said wheel and into snap-on, pry-off engagement with said retaining means, said annulus having a generally axially extending portion adapted to telescope within said intermediate base flange and a plurality of tabs deflected radially outwardly from said portion into resilient engagement with said intermediate base flange.

12. In combination, a wheel having a plurality of circumferentially spaced spring clips, a drop center rim attached to said wheel and having an intermediate base flange, and a wheel cover comprising a circular disk disposed over said wheel and the intermediate flange of said rim, and an annulus in nested relation with said disk having its radially outer periphery secured to the latter, the radially inner periphery of said annulus extending rearwardly into snap-on, pry-off engagement with said spring clips, said annulus having a generally axially extending portion adapted to telescope within said intermediate base flange and a plurality of tabs deflected radially outwardly from said portion into resilient engagement with said intermediate base flange.

13. In a wheel structure including a wheel body and a tire rim supported thereby, a cover assembly for disposition over the outer side of the wheel, said assembly including a circular body member and an annular member, said annular member having a tire rim overlying portion provided at its radially inner side by a portion for engagement with the tire rim and provided with an inturned terminal bead, said body portion having a terminal bead about which the terminal bead of said annular member is engaged for thereby maintaining the body portion and the annular member in attached assembly, and means for retaining the cover assembly on the wheel, said engagement of said annular member bead with the tire rim retaining the cover assembly against radial displacement relative to the wheel.

References Cited in the file of this patent

UNITED STATES PATENTS

| Re. 22,119 | Lyon | June 16, 1942 |
| 2,113,541 | Blank | Apr. 5, 1938 |
| 2,239,366 | Lyon | Apr. 22, 1941 |
| 2,265,241 | Lyon | Dec. 9, 1941 |
| 2,327,044 | Horn | Aug. 17, 1943 |
| 2,414,824 | Lyon | Jan. 28, 1947 |
| 2,493,001 | Lyon | Jan. 3, 1950 |
| 2,569,482 | Lyon | Oct. 2, 1951 |